United States Patent [19]

Foraker

[11] Patent Number: 4,903,748
[45] Date of Patent: Feb. 27, 1990

[54] AUTOMOBILE WINDSHIELD COVER

[76] Inventor: Timothy H. Foraker, 3245 Calle Bonita (P.O. Box 565), Santa Ynez, Calif. 93460

[21] Appl. No.: 205,442

[22] Filed: Jun. 10, 1988

[51] Int. Cl.$^4$ ............................................... B60J 1/20
[52] U.S. Cl. ............................... 160/370.2; 296/97.1; 296/97.8
[58] Field of Search ....... 160/370.2, DIG. 2, DIG. 3; 296/95 C, 95 Q, 95 R, 97 R, 97 A

[56] References Cited

U.S. PATENT DOCUMENTS

| | | |
|---|---|---|
| 2,437,845 | 3/1948 | Wyeth. |
| 2,599,066 | 6/1952 | Osborn. |
| 2,624,406 | 1/1953 | Szychowski et al.. |
| 2,646,118 | 7/1953 | Berty. |
| 3,964,780 | 6/1976 | Naidu ............................ 160/370.2 X |
| 4,355,839 | 10/1982 | Rosen. |
| 4,635,993 | 1/1987 | Hooper et al.. |

FOREIGN PATENT DOCUMENTS 2927288 1/1981 Fed. Rep. of Germany .... 296/95 C

Primary Examiner—Blair M. Johnson
Attorney, Agent, or Firm—Kelly, Bauersfeld & Lowry

[57] ABSTRACT

An automobile windshield cover includes a central body portion dimensioned to substantially cover the windshield of a vehicle, and a clamping portion which extends from each end of the central body portion to be retained between the adjacent front door and frame on each side of the vehicle. A plug portion is affixed to each clamping portion to prevent the clamping portion from being drawn through the space between the door and vehicle frame when the door is closed. A plurality of rope segments are attached to the inner surface of the central body portion to space the central body portion from the windshield. The spacing between the central body portion and the windshield permits air to circulate therebetween, and minimizes contact between a potentially hot cover with the windshield when used outdoors.

19 Claims, 2 Drawing Sheets

AUTOMOBILE WINDSHIELD COVER

BACKGROUND OF THE INVENTION

This invention relates generally to flexible protective covers for various portions of vehicles. More specifically, the present invention relates to automobile windshield covers having a design that reduces heat transfer between the cover and the adjacent covered portion of the vehicle.

Exposure to sunlight is a major cause of deterioration of the plastic and rubber parts found in most vehicle interiors. Portions of the vehicle interior, such as the dashboard, are particularly susceptible to discoloration and cracking because they are directly exposed to sunlight through the windshield and side windows. The prior art includes several types of window covers designed for such protection that are placed either inside or outside the vehicle.

Among the protective covers for use inside the vehicle are Venetian blinds, unfoldable fans and flexible fabric covers laid directly over the dashboard. All inside covers, however, allow sunlight to enter the vehicle and thus do not prevent the interior from being heated. They protect from direct exposure to the sun only what is in their shadow.

External covers have the advantage of more fully protecting against the sun because the light never enters the vehicle. In addition, external covers can also protect against other environmental factors such as snow, frost and dirt. On a warm, sunny day, however, prior external covers have proven to be less than ideal, primarily because of the heat transfer which occurs between the hot cover and the vehicle.

By way of example, a cover over a windshield of a vehicle parked in the sun can become very hot, and that heat is transmitted to the interior of the vehicle, through the windshield, due to direct contact between the cover and the windshield. It has been found that the vehicle interior can be elevated to a temperature of 140° F. or more on a warm day due to such heat transfer, even though an external cover is used.

Accordingly, there has been a need for a novel cover for selected portions of a vehicle which inherently provides some type of insulation barrier between the cover and the covered portion of the vehicle. Such a cover should preferably utilize existing attachment sites on the vehicle, be simple to use, and have a construction that prevents theft without destroying the utility of the cover. Further, there is a need for a cover for selected portions of a vehicle which is constructed to facilitate transfer of heat from the cover to the surrounding environment, while minimizing heat transfer to the covered portion of the vehicle. The cover should additionally utilize readily available materials and common manufacturing techniques in order to minimize fabrication costs and the like. The present invention fulfills these needs and provides other related advantages.

SUMMARY OF THE INVENTION

The present invention resides in an improved cover for a selected portion of a vehicle, which has a design that reduces heat transfer between the cover and the adjacent covered portion of the vehicle. The cover comprises a central body portion sized and shaped to overlie the selected portion of the vehicle to be covered, and at least one clamping portion. The clamping portion extends from the central body portion and has a length adapted to extend between a vehicle closure member and the vehicle body. Contact between the central body portion and the selected portion of the vehicle to be covered is minimized by bead means fixed to an inner surface of the body portion for spacing it from the selected portion of the vehicle to be covered.

In one preferred form of the invention, the central body portion is generally flexible and is constructed of a plurality of layers of different materials to afford the cover various desirable properties. In particular, the central body portion includes a first outer layer of reflective material and a second inner layer of selected material to minimize scratches from, and sticking of, the cover to the covered portion of the vehicle.

As is shown in the accompanying drawings, the preferred embodiment comprises an automobile windshield cover. The first layer of reflective material is provided to reflect away as much light as possible and minimize heat buildup within the cover. The second inner layer forms a smooth, soft and absorbent surface which faces toward the automobile windshield. A third intermediate layer is provided between the first and second layers of the central body portion, and is formed of a selected synthetic material onto which the reflective material of the first outer layer is vacuum deposited. Moreover, a fourth intermediate layer can also be provided between the second and third layers to provide a flexible backing for the second layer of soft flexible material which can be easily adhered to the third layer. It has been found that such an arrangement provides a convenient manner in which the first and second layers can be affixed to one another.

Further with respect to the preferred embodiment, the at least one clamping portion comprises two clamping portions disposed at each end of the central body portion for extending around the ends of the windshield and between the front door and its frame on each side of the vehicle. Each clamping portion is sized and shaped to be as wide as possible without limiting the size and shape of the central body portion. It is the clamping portions which tend to hold the automobile windshield cover in place over the windshield. As shown, the clamping portions are simply extensions of the central body portion, and are constructed of the same materials and in the same manner as the central body portion.

A plug portion is affixed to each clamping portion, and generally comprises a foam dowel held within an extension of each clamping portion. When the automobile windshield cover is placed over a typical automobile windshield, the plug portion is placed within the vehicle interior and has a sufficient size to prevent it from being withdrawn between the respective front door and adjacent frame. Although a compressible foam dowel is preferred, the dowel is dimensioned so that when compressed it still cannot be drawn through the space between the two adjacent vehicle portions. This effectively prevents theft of the windshield cover without first destroying its utility.

The bead means includes a plurality of rope segments evenly spaced from one another and extending substantially the height of the body portion. The rope segments are fixed to the central body portion by means of attachment strips which are sewn to the central body portion. The bead means effectively space the body portion from the adjacent windshield, to provide vent means wherein air freely passes.

The importance of this vent means can be appreciated when one realizes that heat buildup within the cover itself can be transferred to air which tends to flow generally unidirectionally upwardly through the space between the windshield and the cover as the air is heated. Thus, the air between the cover and the windshield is not trapped, and air heated by the cover escapes the confined space between the windshield and the cover before substantial heat transfer is effected from the heated air through the windshield.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
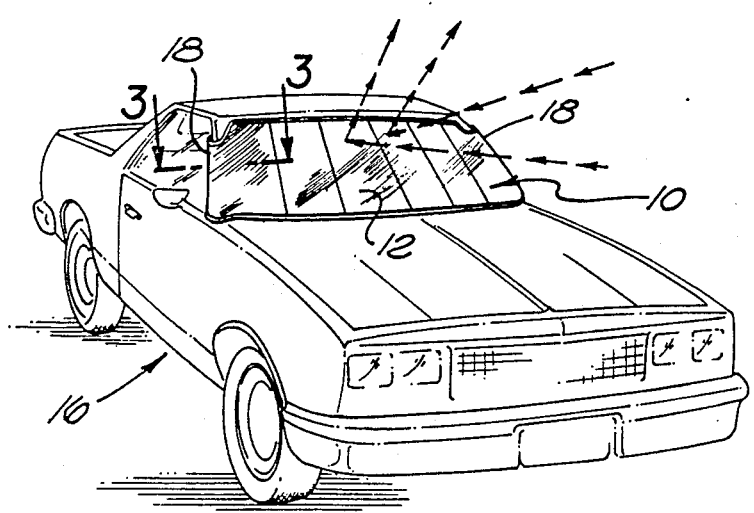
FIG. 1 is a perspective view of a vehicle with a protective cover embodying the present invention placed exteriorly over the windshield.

As shown in the drawings for purposes of illustration, the present invention is concerned with an improved automobile windshield cover, generally designated in the accompanying drawings by the reference number 10. This improved cover 10 comprises, generally, a central body portion 12 which is dimensioned to substantially cover a windshield 14 of an automobile 16, and two clamping portions 18 which extend from each end of the central body portion 12. Means are provided for spacing the central body portion 12 from the windshield 14. This has the effect of creating an insulation barrier between the central body portion 12 and the windshield 14, to thus minimize heat transfer from the cover 10 to the automobile 16.

In accordance with the present invention, and as illustrated best in FIGS. 1, 2 and 4 through 7, the cover 10 is formed primarily of a sheet 20 of flexible material tailored generally to the shape of the windshield 14. More specifically with respect to FIG. 4, this sheet 20 of material comprises several distinct layers of different materials which impart desired protective qualities to the automobile windshield cover 10.

In particular, the sheet 20 of flexible material forming the central body portion 12 and the clamping portions 18 comprises four distinct layers of material, including a first outer layer 22 of reflective material, and a second inner layer 24 of selected material to minimize scratches from, and sticking of, the cover 10 to the windshield 14. The first outer layer 22 is preferably an aluminized surface which is vacuum deposited upon a polyethylene or polypropylene, grid-like intermediate third layer 26. The second inner layer 24 can be formed of virtually any material which will not damage the windshield 14, and it preferably has a cotton-like texture. This second inner layer 24 is fixed to a fourth intermediate layer 28. The fourth intermediate layer 28 and the third intermediate layer 26 are adhered to one another to fix the first layer 22 with respect to the second layer 24.

Figure 8:
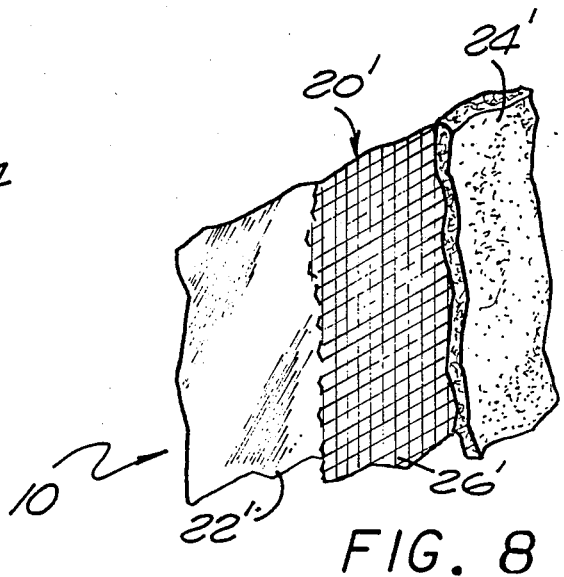
FIG. 8 is a view similar to that shown in FIG. 4, illustrating another embodiment of the construction of the central body portion of the cover.

In an alternative embodiment illustrated in FIG. 8, the fourth intermediate layer 28 can be deleted. More specifically, the central body portion 12 and the clamping portions 18 can be formed primarily of a sheet of material 20', wherein the third intermediate layer of material 26' supports both the first outer layer 22' and the second inner layer 24'. In all other respects, the alternative sheet of material 20' is virtually identical to the sheet of material 20 described in connection with FIG. 4.

Figure 2:
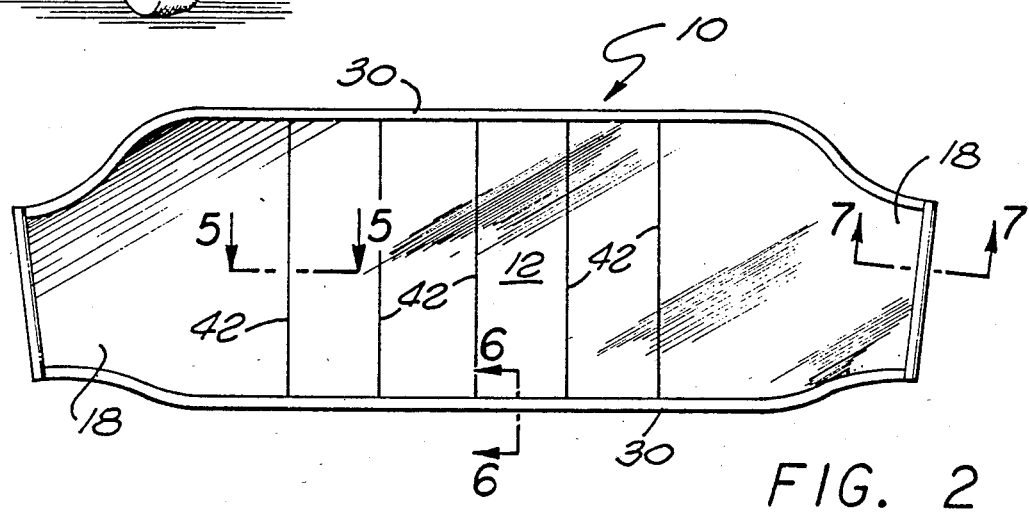
FIG. 2 is an enlarged front elevational view of an automobile windshield cover embodying the invention.
Figure 6:
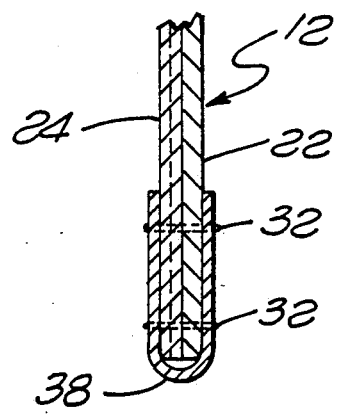
FIG. 6 is an enlarged fragmented section taken generally along the line 6—6 of FIG. 2, illustrating the attachment of a cloth or vinyl end-piece about the upper and lower edges of the cover.
Figure 7:
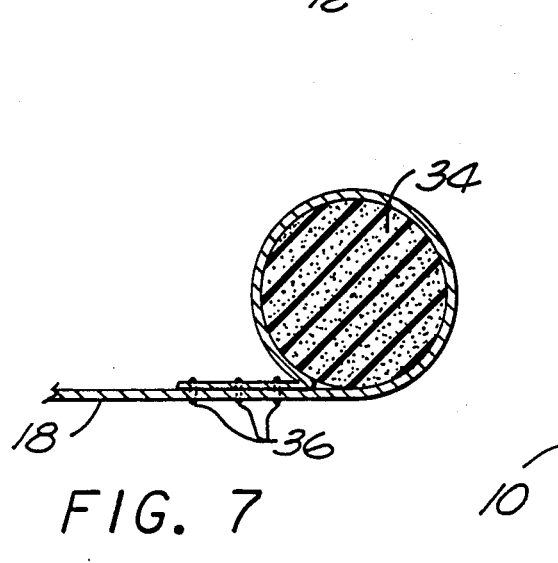
FIG. 7 is an enlarged fragmented section taken generally along the line 7—7 of FIG. 2, illustrating the detail of a foam plug portion positioned within and attached to a clamping portion.

As illustrated best in FIGS. 2, 6 and 7, the upper and lower edges of the sheet of material 20 forming the central body portion 12 and clamping portions 18, are covered with cloth or vinyl end-pieces 30 which are held in place by stitching 32. At each end of the clamping portions 18, a foam dowel 34 is positioned to create a plug portion of the windshield cover 10. The plug portions are formed by enclosing the dowels 34 within a portion of the sheet of material 20 at the ends of the clamping portions 18, and then fastening them in place by means of seams 36. Although the dowels 34 can be formed of virtually any material which prevents the clamping portions 18 from being pulled through a space between the front door 38 and the frame 40 of the automobile 16, a compressible foam is preferred. Such a compressible foam will not damage the door components of the automobile 16 should the dowel 34 be accidentally misaligned while the door is being closed.

Figure 5:
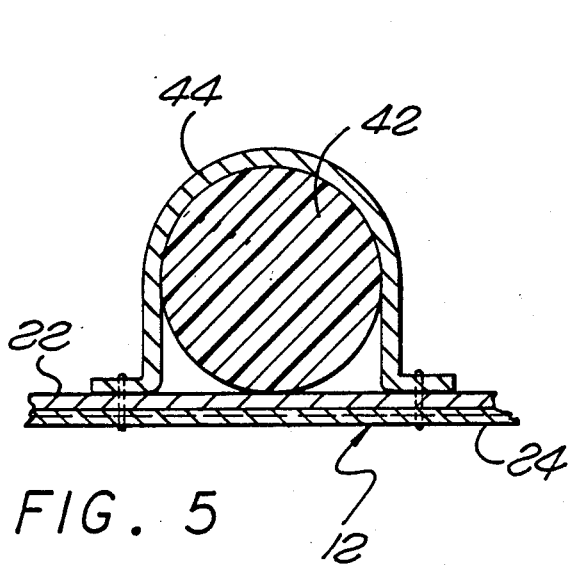
FIG. 5 is an enlarged fragmented section taken generally along the line 5—5 of FIG. 2, illustrating the manner in which rope segments are attached to the inner surface of the central body portion for spacing the cover from the windshield.

The means for spacing the central body portion 12 from the windshield 14 includes a plurality of rope segments 42 which are evenly spaced from one another on the inner surface of the central body portion 12. It is to be understood that the rope segments 42 can be fabricated of virtually any material (i.e. nylon, polyethylene, polypropylene, extruded foam, etc.). These rope segments 42 extend substantially the height of the body portion 12, and, as illustrated best in FIG. 5, are held in place by means of attachment strips 44 placed over respective ones of the rope segments and sewn to the body portion 12. These attachment strips 44 are similar to the end pieces 30, and can be manufactured of cloth or vinyl material.

The two clamping portions 18 are sized and shaped to be as wide as possible without limiting the size and shape of the central body portion 12. Not only does this increase the surface area of the automobile 16 covered by the windshield cover 10, but it also insures that a thief attempting to remove the cover from the automobile will have to destroy the utility of the cover in order to remove it from the windshield 14.

Figure 3:
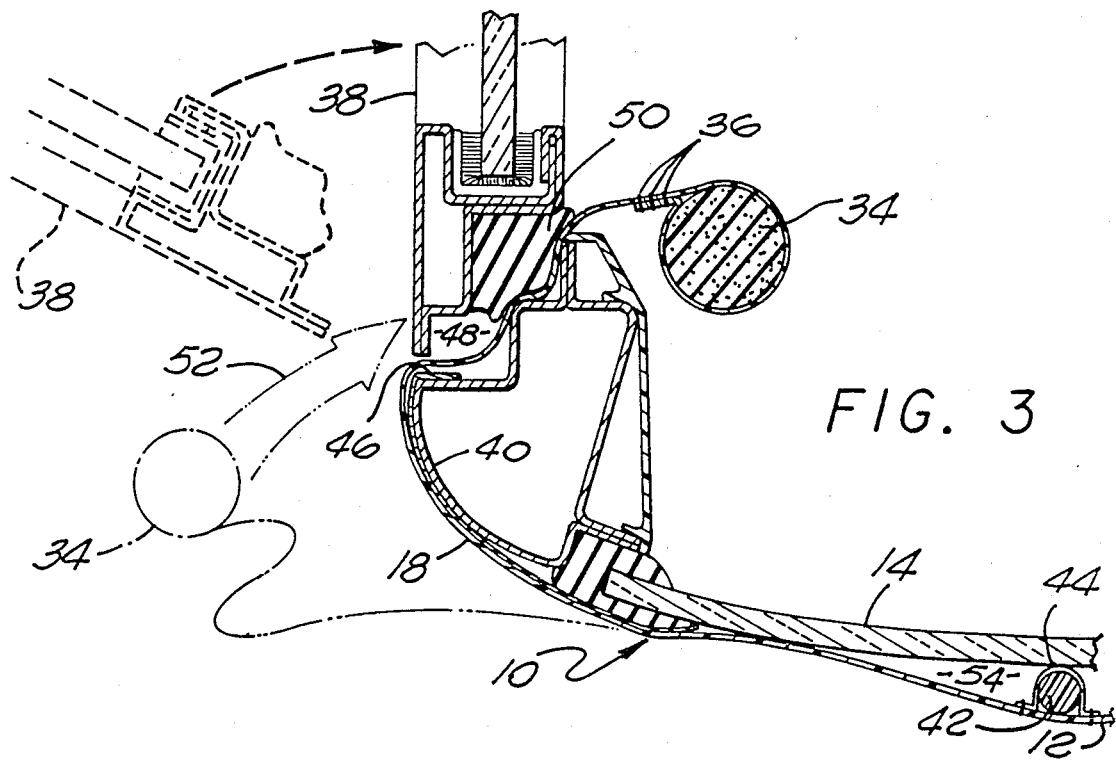
FIG. 3 is an enlarged fragmented horizontal section taken generally along the line 3—3 of FIG. 1, illustrating the manner in which a clamping portion of the cover extends from a central body portion, around the end of the windshield and between the front door and the vehicle frame.
Figure 4:
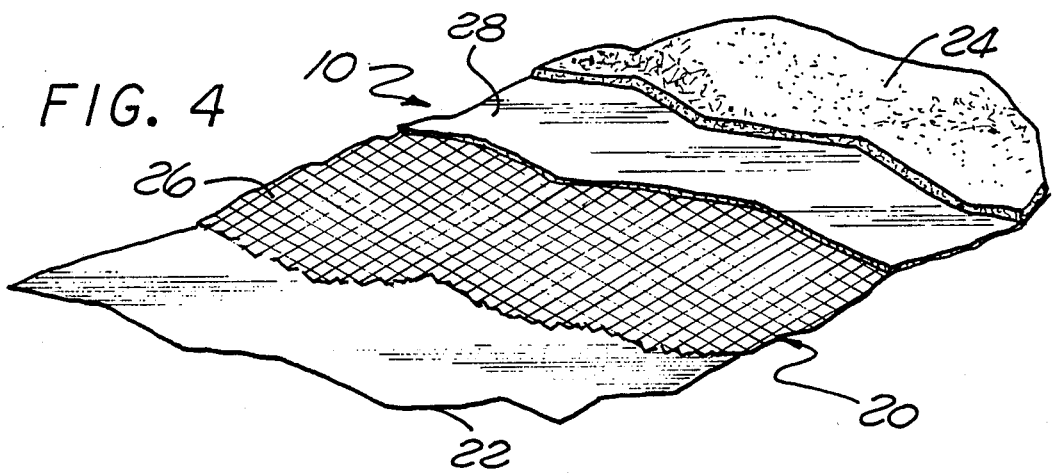
FIG. 4 is a fragmented view of the central body portion of the automobile windshield cover illustrated in FIG. 2, showing the various layers comprising one embodiment thereof.

With reference now to FIG. 3, the automobile 16 is illustrated as having the front door 38 suitably hinged to the adjacent automobile frame 40 in a known manner. The door 38 serves as a closure member for an opening 46 provided in the vehicle body for the door. The edge of the opening 46 and the peripheral edge of the door 38 usually correspond in shape and configuration and provide a relatively narrow space 48 between the peripheral edges of the door 38 and the opening 46. It is understood that such peripheral space is normally sealed by suitable door gasket means 50.

The length of each clamping portion 18 is generally sufficient to extend around the end of the windshield 14, through the space 48 between the door 38 and its frame 40, and into the interior of the automobile 16.

Prior to attaching the windshield cover 10 to the automobile 16, it is generally recommended that the windshield wipers (not shown) be lifted away from the windshield 14. The central body portion 12 can then be conveniently laid in place over the windshield 14 with the rope segments 42 extending inwardly to contact the outer surface of the windshield 14. One door 38 is opened (as shown in phantom in FIG. 3) and the adjacent plug portion (formed by the foam dowel 34) is placed within the interior of the automobile 16 (see arrow 52 in FIG. 3), so that when the door is closed the dowel will be inside the vehicle. The clamping portion 18 of the cover 10 is captured between the door 38 and the door frame 40 when the door is closed. This process is then repeated with the other door.

As mentioned previously, the dowel 34 of the plug portion can be constructed of virtually any material which is rigid enough or thick enough when compressed to keep the plug portion from collapsing and being pulled from the interior of the automobile 16 between the door 38 and the frame 40 if an attempt is made to remove the cover 10 without opening the doors. Designed in this way, the cover 10 cannot be removed without cutting off the plug portions or opening the doors 38 of the automobile 16. If the doors are locked, the cover 10 is secure. A cover which is cut off will not be functional unless there is sufficient material remaining at its ends to still allow clamping between the door 38 and the frame 40.

An important feature of the present invention is the provision of the rope segments 42 on the inner surface of the central body portion 12, which extend generally the height of the windshield cover. These rope segments 42 act as spacers to create an air gap 54 between the windshield cover 10 and the windshield 14. This air gap 54 acts as an insulating barrier to minimize heat transfer directly from the windshield cover 10 to the windshield 14.

For example, when the cover 10 is placed upon an automobile parked in direct sunlight during a hot day, the reflective nature of the first outer layer 22 of the sheet of material 20 will only be initially effective in preventing the cover 10 itself from becoming warm. After some time, the cover 10 will begin to heat up, and if allowed to lie directly against the windshield 14, the heat of the cover 10 will be conducted and radiated through the windshield 14 into the interior of the automobile 16. However, the rope segments 42 minimize the amount of heat directly transferred from the cover 10 (and specifically the central body portion 12). Further since the air flow channels between adjacent rope segments 42 are open ended, hot air adjacent to the windshield 14 will tend to rise and escape from the insulating gap 54, while cooler air is drawn into these air flow channels at the bottom of the windshield.

From the foregoing it is to be appreciated that the improved automobile windshield cover 10 is constructed to facilitate transfer of heat from the cover to the surrounding environment, while minimizing heat transfer to the covered portion of the automobile 16. The cover 10 utilizes existing attachment sites on the automobile, is simple to use, and has a construction that prevents theft without destroying the utility of the cover. Moreover, the cover 10 is constructed of readily available materials and utilizes common manufacturing techniques, resulting in economy of manufacture.

Although a particular embodiment of the invention has been described in detail for purposes of illustration, various modifications may be made without departing from the spirit and scope of the invention. Accordingly, the invention is not to be limited, except as by the appended claims.

I claim:

1. A cover for a selected exterior portion of a vehicle, said cover comprising:
   a central body portion sized and shaped to cover the selected portion of the vehicle to be covered;
   bead means fixed to an inner surface of the body portion, for spacing the body portion from the selected portion of the vehicle to be covered such that the spacing provides vent means wherein air freely passes; and
   at least one clamping portion extending from the central body portion and having a length adapted to extend between a vehicle closure member and the vehicle body.

2. A cover as set forth in claim 1, wherein the at least one clamping portion includes two clamping portions disposed with one at each end of the body portion for extending around the ends of a windshield and between the front door and its frame on each side of the vehicle.

3. A cover as set forth in claim 2, wherein the bead means includes a plurality of rope segments spaced from one another and extending substantially the height of the body portion.

4. A cover as set forth in claim 3, wherein the bead means is fixed to the body portion by means of attachment strips placed over respective ones of the bead means and sewn to the body portion.

5. A cover as set forth in claim 4, wherein the spacing between the body portion and the selected portion of the vehicle to be covered provides open ended air flow channels between adjacent rope segments.

6. A cover as set forth in claim 2, including a plug portion affixed to each clamping portion for placement within the vehicle, the plug portion being of sufficient size to prevent its being withdrawn from between the front door and its frame, the plug portion including a foam dowel held within an extension of each clamping portion wherein the dowel is dimensioned so that when compressed the plug will be prevented from being drawn through the space between the front door and its frame.

7. A cover as set forth in claim 1, wherein the body portion includes a first outer layer of reflective material, and a second inner layer of selected material to minimize scratches from, and sticking of, the cover to the covered portion of the vehicle.

8. A cover as set forth in claim 7, wherein the body portion includes a third intermediate layer of a selected synthetic material, wherein the first outer layer of reflective material is vacuum deposited thereon.

9. A cover as set forth in claim 8, wherein the body portion includes a fourth intermediate layer of a selected material to which the second inner layer is fixed, the fourth layer and the third layer being adhered to one another to fix the first layer with respect to the second layer.

10. A cover for a selected exterior portion of a vehicle, said cover comprising:
 a body portion of flexible material sized and shaped to cover the selected portion of the vehicle to be covered;
 at least one clamping portion positioned with respect to the body portion to be captured at a site on the vehicle between two adjacent vehicle portions where at least one of the two adjacent vehicle portions is movable for holding the body portion in place on the vehicle;
 a plug portion affixed to each clamping portion for placement adjacent to the inner surface of the two adjacent vehicle portions, the plug portion being of sufficient size to prevent its being withdrawn from between the two adjacent vehicle portions; and
 bead means fixed to an inner surface of the body portion, for spacing the body portion from the selected portion of the vehicle to be covered such that the spacing provides open ended air flow channels between adjacent bead means, wherein air freely passes through the open ended air channels.

11. A cover as set forth in claim 10, wherein the at least one clamping portion includes at least two clamping portions disposed to be captured at two different sites on the vehicle, wherein the at least two clamping portions are sized and shaped to be as wide as possible without limiting the size and shape of the body portion.

12. A cover as set forth in claim 11, wherein the at least two clamping portions are at each end of the body portion for extending around the ends of a windshield and between the front door and its frame on each side of the vehicle.

13. A cover as set forth in claim 10, wherein the body and clamping portions include at least one layer of a first selected material to protect the covered portion of the vehicle from exposure to at least one environmental property.

14. A cover as set forth in claim 13, wherein the body and clamping portions include a second inner layer of a selected material to minimize scratches from, and sticking of, the cover to the covered portion of the vehicle.

15. A cover as set forth in claim 14, wherein the first selected material comprises a reflective material vacuum deposited onto a flexible synthetic backing, and the second selected material comprises a soft, absorbent material.

16. A cover as set forth in claim 10, wherein the plug portion includes a foam dowel held within an extension of each clamping portion, the dowel being dimensioned so that when compressed the plug will be prevented from being drawn through the space between the two adjacent vehicle portions.

17. A cover as set forth in claim 10, wherein the bead means includes a plurality of rope segments evenly spaced from one another and extending substantially the height of the body portion.

18. A cover as set forth in claim 17, wherein the bead means is fixed to the body portion by means of attachment strips placed over respective ones of the bead means and sewn to the body portion.

19. An automobile windshield cover, comprising:
 a central body portion of flexible material sized and shaped to cover a windshield, the body portion including an outer layer of reflective material and an inner layer of selected material to minimize scratches from, and sticking of, the cover to the windshield;
 at least two clamping portions disposed at each end of the central body portion for extending around the ends of the windshield and between a front door and its frame on each side of a vehicle, wherein the two clamping portions are sized and shaped to be as wide as possible without limiting the size and shape of the central body portion;
 a plug portion affixed to each clamping portion for placement within the vehicle, the plug portion including a foam dowel which is dimensioned so that when compressed the plug will be prevented from being drawn through the space between the respective front door and frame; and
 bead means fixed to an inner surface of the central body portion, for spacing the central body portion from the windshield, the bead means including a plurality of rope segments extending substantially the height of the body portion, the bead means being fixed to the body portion by means of attachment strips placed over respective ones of the bead means and sewn to the body portion, wherein the space between the body portion and the windshield provides vent means wherein air freely passes.

* * * * *